(12) United States Patent
Forgue

(10) Patent No.: US 8,922,655 B2
(45) Date of Patent: Dec. 30, 2014

(54) VEHICLE FRONT GRILLE ASSEMBLY

(75) Inventor: Brittany Forgue, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 626 days.

(21) Appl. No.: 13/284,300

(22) Filed: Oct. 28, 2011

(65) Prior Publication Data
US 2013/0107046 A1 May 2, 2013

(51) Int. Cl.
H04N 7/18 (2006.01)
B60R 19/52 (2006.01)
B60R 11/04 (2006.01)
B60R 13/00 (2006.01)

(52) U.S. Cl.
CPC .............. B60R 19/52 (2013.01); B60R 11/04 (2013.01); H04N 7/18 (2013.01); B60R 13/005 (2013.01)
USPC ........... 348/148; 224/309; 348/118; 348/373; 348/374; 352/243; 362/494

(58) Field of Classification Search
CPC .......... H04N 7/18; B60R 19/52; B60R 11/04; B60R 13/005; B60R 13/04
USPC ................... 348/148, 373; 352/243
See application file for complete search history.

(56) References Cited

U.S. PATENT DOCUMENTS

2007/0115434 A1*  5/2007  Oba et al. ................... 352/243
2007/0182817 A1*  8/2007  Briggance .................. 348/118
2008/0231744 A1*  9/2008  Khanna et al. .............. 348/373
2009/0231430 A1*  9/2009  Buschmann et al. ......... 348/148
2009/0290369 A1*  11/2009  Schofield et al. ............ 362/494
2013/0155238 A1*  6/2013  Scudder et al. .............. 348/148

FOREIGN PATENT DOCUMENTS

| DE | 10 2009 039302 A | 3/2011 |
| JP | 2001-58543 A | 3/2001 |
| JP | 2003-159997 A | 6/2003 |
| JP | 2005-199837 A | 1/2004 |
| JP | 2009-83720 A | 4/2009 |
| JP | 2010-69989 A | 4/2010 |
| WO | WO-2011/086131 A | 7/2011 |

OTHER PUBLICATIONS

Image of 2008 Nissan Elgrand.
Image of 2008 Toyota Corolla.
Image of 2009 Nissan Elgrand.
Image of 2011 Audi A8.

(Continued)

Primary Examiner — Jay Patel
Assistant Examiner — Neil Mikeska
(74) Attorney, Agent, or Firm — Global IP Counselors, LLP

(57) ABSTRACT

A vehicle front grille assembly includes a vehicle grille, an emblem, a camera support and a camera. The vehicle grille includes an emblem mounting portion having a first mounting structure. The emblem includes an outer surface and an inner surface that is opposite the outer surface. The inner surface has a second mounting structure that directly mates with the first mounting structure of the emblem mounting portion. The camera support has an attachment portion and an extension portion. The attachment portion is sandwiched between the emblem mounting portion of the vehicle grille and the inner surface of the emblem. The attachment portion includes at least one opening and one of the first and second mounting structures extends through the at least one opening of the attachment portion. The camera is fixedly mounted to the extension portion of the camera support.

12 Claims, 13 Drawing Sheets

(56) References Cited

OTHER PUBLICATIONS

Enlarged image of 2011 Audi A8.
Image of 2011 Infiniti EX.
Image of 2011 Infiniti QX.
Enlarged image of 2011 Infiniti QX.
Image of 2011 Nissan Serena.
Image of 2012 Ford F-150.
Manual of 2012 Infiniti EX.
Image of 2012 Volkswagen CC.
Enlarged image of 2012 Volkswagen CC.

* cited by examiner

VEHICLE FRONT GRILLE ASSEMBLY

BACKGROUND

1. Field of the Invention

The present invention generally relates to a vehicle front grille assembly. More specifically, the present invention relates to grille assembly that includes a camera and camera support structure.

2. Background Information

All vehicles have exterior surfaces that are difficult or impossible to observe from the driver's seat of the vehicle. Consequently, it can be difficult to determine the distance between one of the unseen surfaces of the vehicle and a potential obstruction close to the vehicle. As a result of this, many vehicles are being provided with cameras and video systems that enable a driver to observe via the camera and video system, the distance between the exterior surfaces of the vehicle and adjacent potential obstructions. For instance, such camera and video systems may be utilized while parking, allowing a driver to instantly determine the actual distance between the exterior surfaces of the vehicle and the potential obstructions. Integrating such camera systems with the vehicle exterior in an attractive or at least inconspicuous manner remains a constant design challenge.

SUMMARY

One object is to provide a vehicle with a camera that is at least partially hidden from view so as to be inconspicuous.

Another object is to utilize a mounting structure a vehicle emblem to additionally secure a camera support and a camera to the vehicle.

In view of the state of the known technology, one aspect of the present disclosure is to provide a vehicle grille assembly that includes a vehicle grille, an emblem, a camera support and a camera. The vehicle grille includes an emblem mounting portion having a first mounting structure. The emblem includes an outer surface and an inner surface that is opposite the outer surface. The inner surface has a second mounting structure that directly mates with the first mounting structure of the emblem mounting portion. The camera support has an attachment portion and an extension portion. The attachment portion is sandwiched between the emblem mounting portion of the vehicle grille and the inner surface of the emblem. The attachment portion defines at least one opening and one of the first and second mounting structures extends through the at least one opening of the attachment portion. The camera is fixedly mounted to the extension portion of the camera support.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
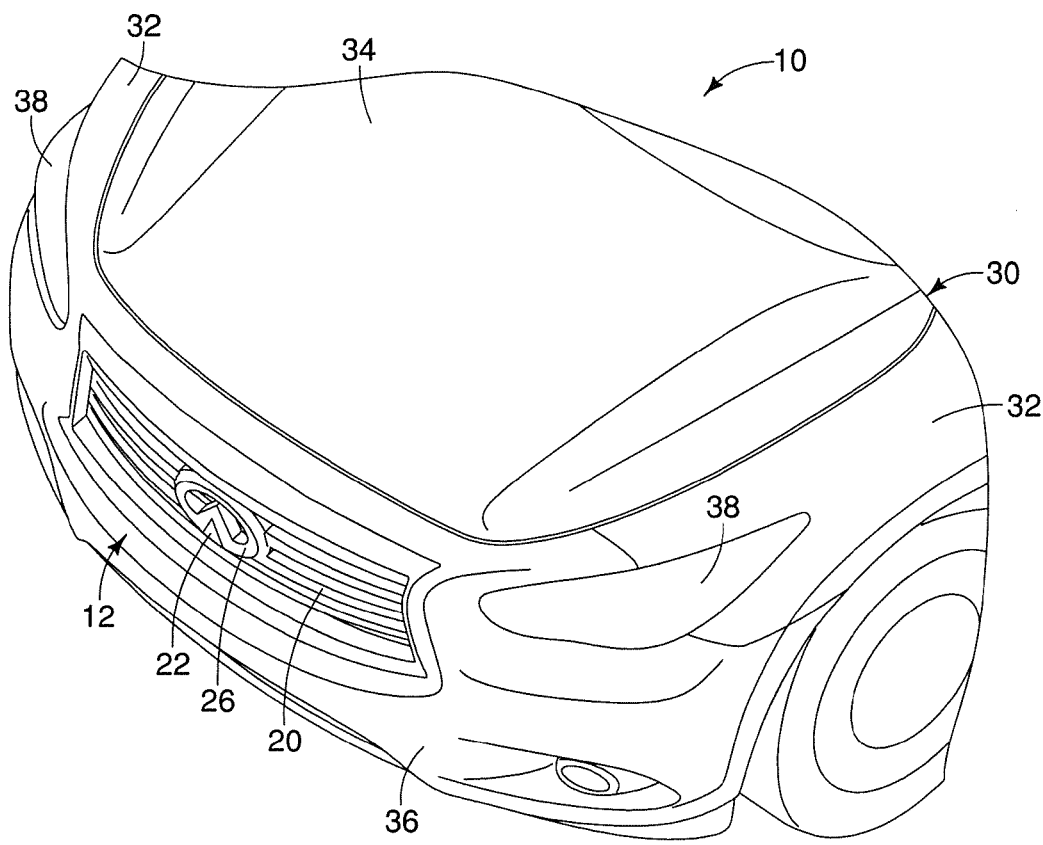
FIG. 1 is a perspective view of a front end of a vehicle showing a front grill assembly that includes a partially hidden camera in accordance with one embodiment.

Referring initially to FIG. 1, a vehicle 10 is illustrated in accordance with a first embodiment. The vehicle 10 includes a front grille assembly 12 with a grille 20, a camera support 22, a camera 24 (FIG. 2) and an emblem 26, that are all described in greater detail below.

The vehicle 10 includes various conventional elements such as a body structure 30, which includes fenders 32, a hood 34, a bumper assembly 36 and headlamp assemblies 38. Since these elements are peripheral to the front grille assembly 12, further description is omitted for the sake of brevity.

Figure 2:
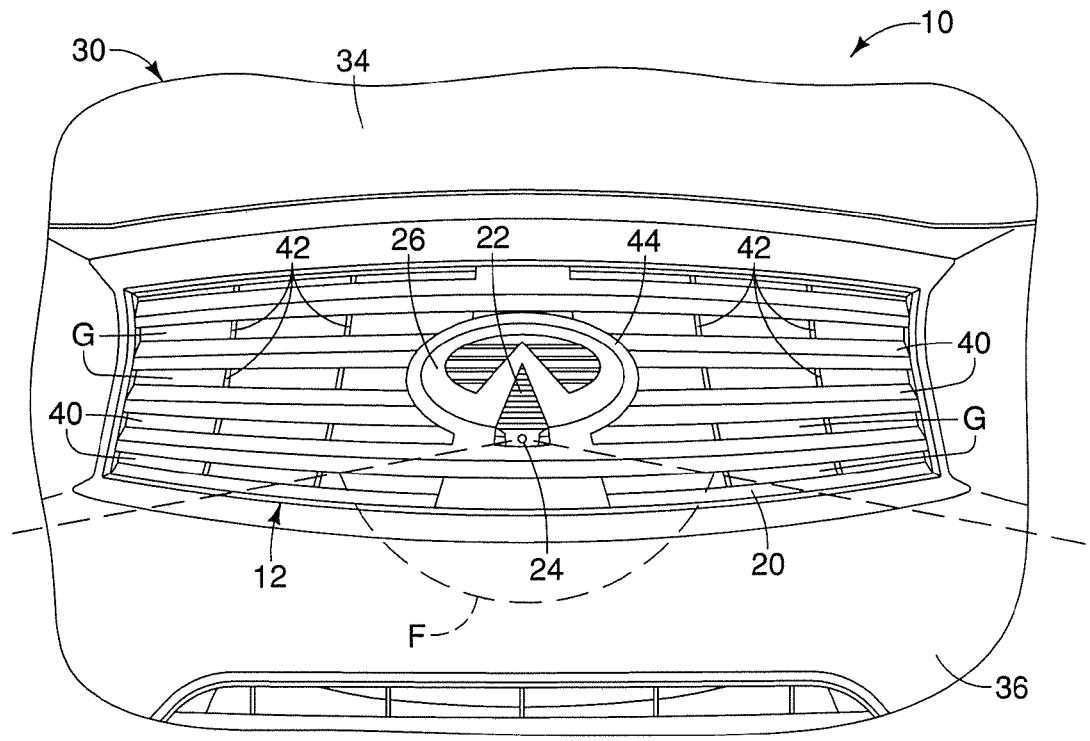
FIG. 2 is a front elevation of the vehicle showing the front grille assembly and the camera located below an emblem in accordance with one embodiment.
Figure 3:
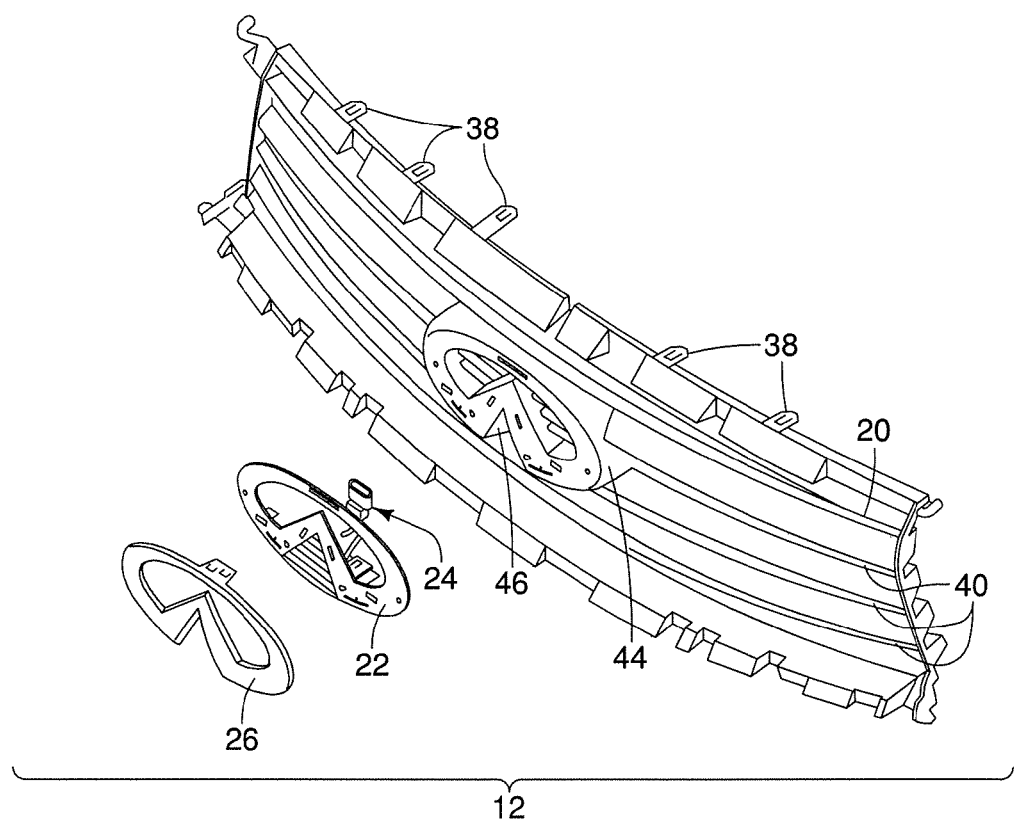
FIG. 3 is an exploded perspective view of the front grill assembly removed from the vehicle showing a grille, a camera support, a camera and the emblem in accordance with one embodiment.

The grille 20 of the front grille assembly 12 is supported to the body structure 30 in a conventional manner. For example, as indicated in FIG. 3, the grille 20 includes mounting structures 39 that attach to structural elements (not shown) of the body structure 30 with fasteners (not shown). The grille 20 is installed to the front of the body structure 30 between front ends of the fenders 32 and above the bumper assembly 36, as shown in FIGS. 1 and 2. The mounting structures 39 and structural elements of the body structure 30 are conventional in nature, and therefore further description is omitted for the sake of brevity.

Figure 4:
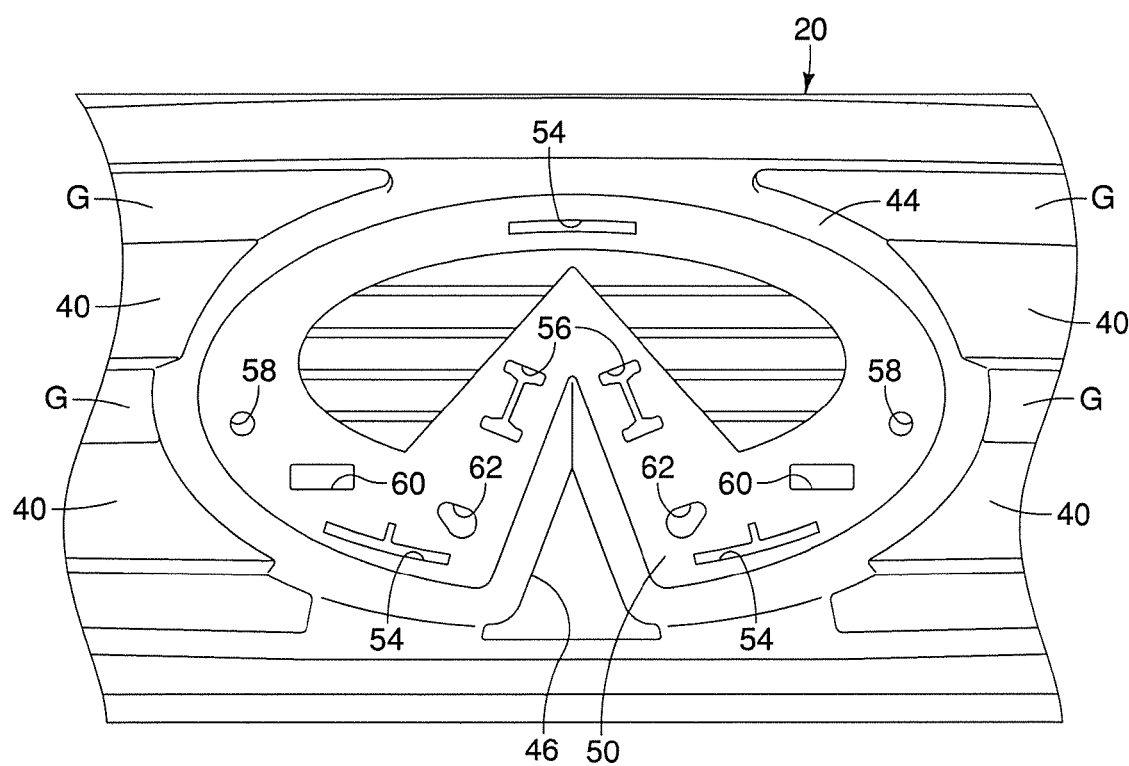
FIG. 4 is a front elevation of the grille, with the camera support, the camera and the emblem removed, showing an emblem mounting portion in accordance with one embodiment.
Figure 23:
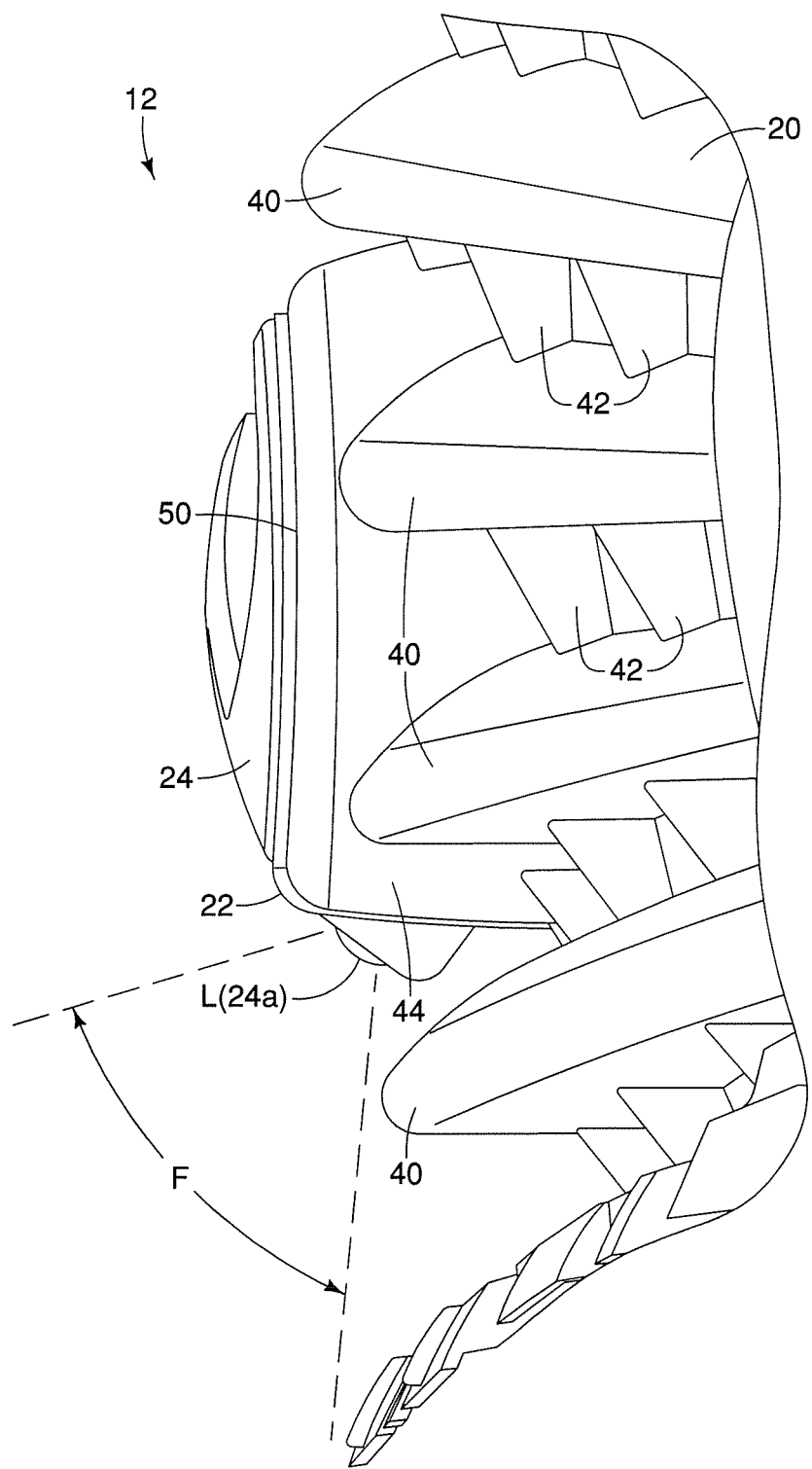
FIG. 23 is a side view of the grille assembly, showing a lens of the camera and a field of vision of the camera relative to the grille in accordance with one embodiment.

As shown in FIGS. 2-4, the grille 20 includes a plurality of laterally extending slats 40 (i.e., laterally extending grille elements), a plurality of vertically extending transverse elements 42 (FIG. 2 only) that form a lattice with air flow gaps G (FIGS. 2 and 4 only), and an emblem mounting portion 44. The air flow gaps G allow fresh air to flow into an engine compartment (not shown) of the vehicle 10 in a conventional manner. As best shown in FIGS. 3 and 23, the plurality of slats 40 have an arcuate shape providing a non-linear contour to the front of the vehicle 10.

In the depicted embodiment, the plurality of laterally extending slats 40, the plurality of vertically extending transverse elements 42 and the emblem mounting portion 44 are formed together as a single monolithic element. In other words, the grille 20 can be molded or formed as single unitary element in a single molding process. Alternatively, the grille 20 can be manufactured as separate elements fastened, or otherwise attached to one another. However in the depicted embodiment, the plurality of slats 40, the plurality of transverse elements 42 and the emblem mounting portion 44 are made of a molded plastic, polymer and/or composite material and formed in a single molding process as a monolithic, non-seamed element. The frontward facing surfaces or other exposed surfaces of the grille 20 can also be painted, plated, and/or adorned with chrome, gold or other colored finishes adhered thereto for aesthetic purposes.

As best shown in FIGS. 3 and 4 with the camera support 22 and the emblem 26 removed, the emblem mounting portion 44 has an overall oval shape corresponding to the shape of the emblem 26. The emblem mounting portion 44 is shaped such that an inverted V-shaped or triangular-shaped opening 46 is formed in a lower area of the oval shape. As best shown in FIG. 23, the emblem mounting portion 44 extends slightly forward of front-most edges of the laterally extending slats 40.

Figure 7:
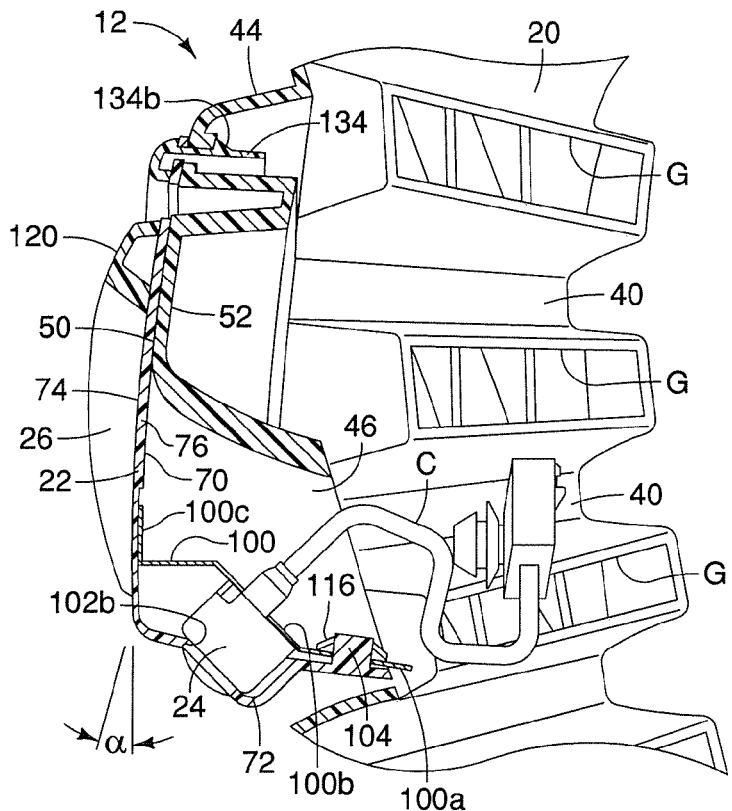
FIG. 7 is a cross-sectional view of the grille assembly taken along the line 7-7 in FIG. 6, showing the grille, the camera support, the camera and the emblem in accordance with one embodiment.
Figure 8:
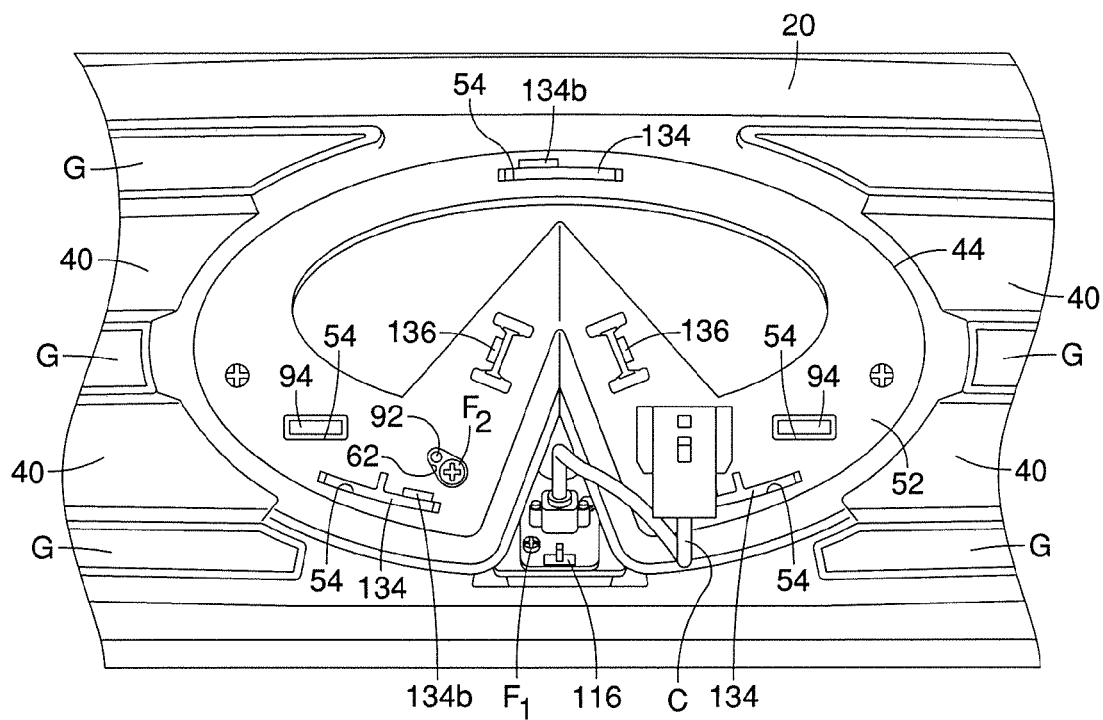
FIG. 8 is a rear elevation of the grille assembly, showing the emblem installed to the emblem mounting portion in accordance with one embodiment.

As shown in FIGS. 4, 7 and 8, the emblem mounting portion 44 includes a forwardly facing surface 50 (FIGS. 4 and 7), a rearwardly facing surface 52 (FIGS. 7 and 8) and a plurality of apertures 54, 56, 58, 60 and 62 (FIG. 4). Each of the apertures 54, 56, 58, 60 and 62 extends from the forwardly facing surface 50 to the rearwardly facing surface 52 of the emblem mounting portion 44 of the grille 20. Further, opening 46 extends from the forwardly facing surface 50 to the rearwardly facing surface 52 of the emblem mounting portion 44 of the grille 20.

As shown in FIG. 4, there are three apertures identified by call-out 54. The apertures 54 are elongated slots that are spaced apart from one another within an outer periphery of the oval shape of the emblem mounting portion 44. More specifically, an upper one of the apertures 54 is an elongated slot that is laterally centered on the emblem mounting portion 44. The other two of the apertures 54 are elongated slots located on opposite lateral sides of the triangular-shaped opening 46 in the lower section of the oval shape of the emblem mounting portion 44.

The apertures 56 are I-shaped slots positioned on opposite sides of the apex of the triangular-shaped opening 46 of the oval shape of the emblem mounting portion 44. The apertures 58 are round holes positioned at opposite lateral sides of the emblem mounting portion 44. The apertures 60 are positioned on opposite sides of the triangular-shaped opening 46 of the oval shape of the emblem mounting portion 44, between respective pairs of the apertures 54 and 58. The apertures 62 are pear-shaped openings positioned on opposite sides of the triangular-shaped opening 46 of the oval shape of the emblem mounting portion 44, between respective pairs of the apertures 54 and 56. The plurality of apertures 54, 56, 58, 60 and 62 define a first mounting structure. More specifically, the apertures 54, 56, 58, 60 and 62 (the first mounting structure) are arranged in a prescribed pattern relative to one another. The function of each of the apertures 54, 56, 58, 60 and 62 is explained in greater detail below.

A description of the camera support 22 is now provided with specific reference to FIGS. 5, 7 and 9-14. The camera support 22 is made of a molded plastic or polymer material in the depicted embodiment. Alternatively, the camera support 22 can also be made of a metal or metal-alloy material. The camera support 22 is basically a bracket that is installed between the emblem mounting portion 44 of the grille 20 and the emblem 26, as is described in greater detail below.

As shown in FIGS. 9-14, the camera support 22 includes an attachment portion 70 and an extension portion 72. The attachment portion 70 includes a front surface 74 (FIGS. 5, 7, 11 and 13) and a rear surface 76 (FIGS. 9, 10, 12 and 13). As shown FIG. 7, when installed to the emblem mounting portion 44 with the emblem 26, the attachment portion 70 is sandwiched between the emblem mounting portion 44 of the grille 20 and an inner surface of the emblem 26. More specifically, when installed, the rear surface 76 overlays and contacts the forwardly facing surface 50 of the emblem mounting portion 44. As is also indicated in FIG. 7, when secured to the emblem mounting portion 44 by the emblem 26, the attachment portion 70 of the camera support 22 is angularly offset from a vertical position toward the emblem mounting portion 44 by an angle α in order to conform to a contour of the forwardly facing surface 50 of the emblem mounting portion 44. For example, the angle α is shown as being approximately equal to 10 degrees in FIG. 7. Further, when the camera support 22 is fully installed, the extension portion 72 extends rearward from the attachment portion 70 to a location rearward of the forwardly facing surface 50 of the emblem mounting portion 44, as shown in FIG. 7. Consequently, the inner and outer surfaces 122 and 120, respectively, of the emblem 26 are angularly offset from a vertical position in a similar manner.

Figure 6:
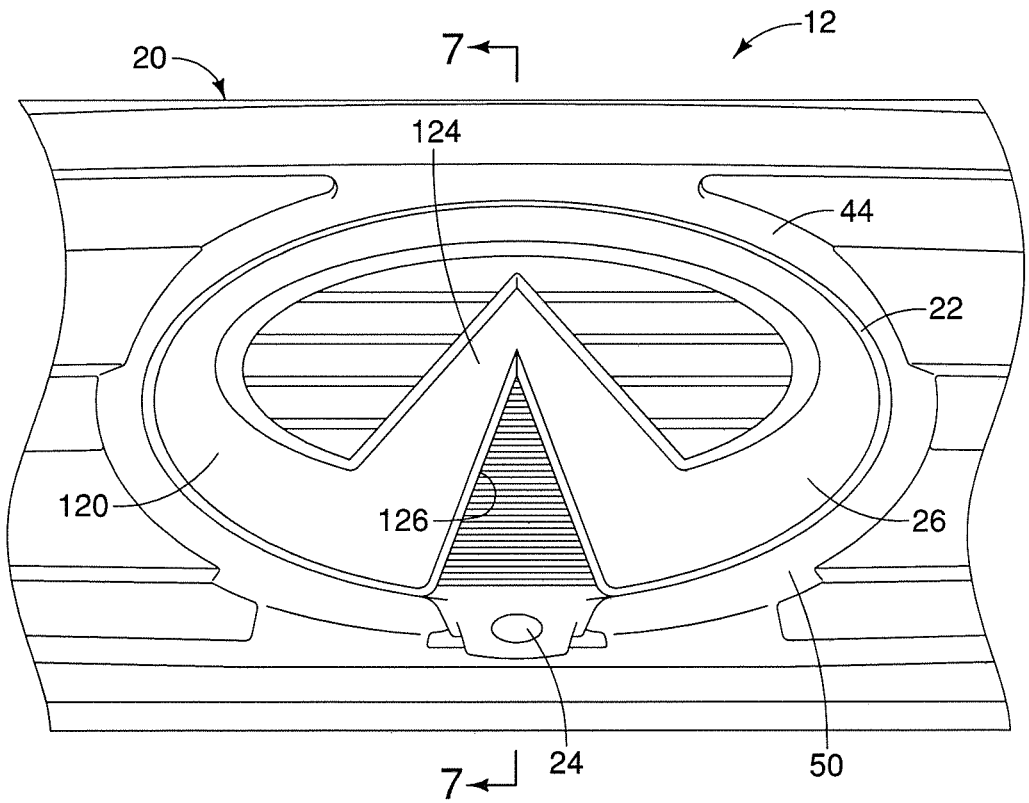
FIG. 6 is another front elevation of the grille, showing the emblem installed over the camera support and to the emblem mounting portion in accordance with one embodiment.
Figure 11:
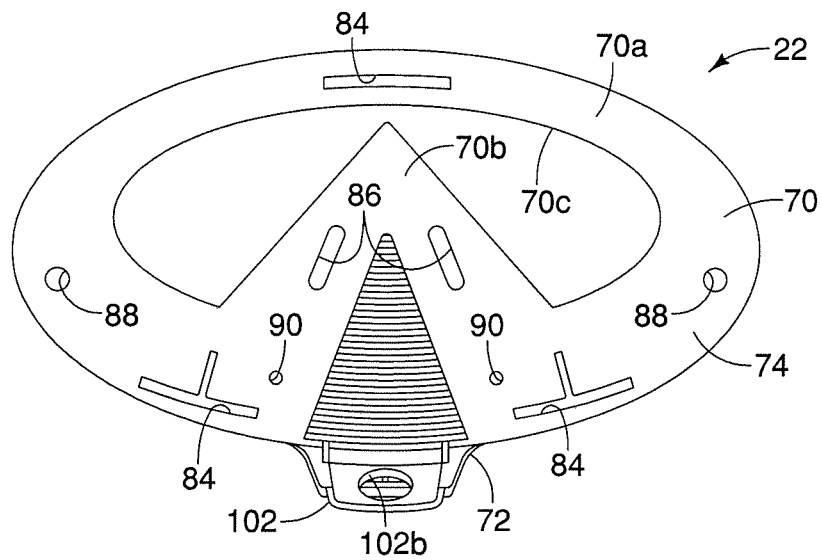
FIG. 11 is a front elevation of the camera support shown removed from all other elements of the partial assembly, in accordance with one embodiment.
Figure 12:
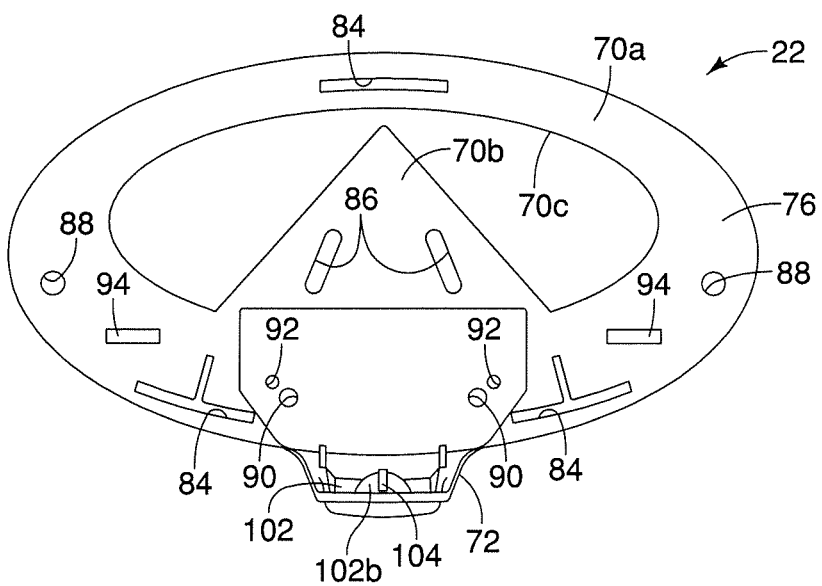
FIG. 12 is a rear elevation of the camera support shown removed from all other elements of the partial assembly, in accordance with one embodiment.

As best shown in FIGS. 11 and 12, the attachment portion 70 has an oval shape that corresponds to the overall shape of the emblem mounting portion 44 of the grille 20 and the overall shape of the emblem 20. The attachment portion 70 has a ring portion 70a and a projection 70b. The ring portion 70a surrounds a central opening 70c, and the projection 70b radially extends into the central opening 70c. The projection 70b has a triangular shape with a pointed end or apex. The width (lateral side to side width) of the attachment portion 70 is slightly smaller than the width of the emblem mounting portion 44. Consequently, sections of the forwardly facing surface 50 of the emblem mounting portion 44 outward from the camera support 22 are visible with the camera support 22 installed to the emblem mounting portion 44, as shown in FIG. 6.

As shown in FIGS. 5, 10, 11 and 12, the attachment portion 70 includes a plurality of openings 84, 86, 88 and 90 that extend from the front surface 74 to the rear surface 76 of the attachment portion 70. There are three openings 84 formed in the ring portion 70a, with one of the openings 84 being formed toward an upper end of the ring portion 70a and the remaining two openings 84 being located on either side of the projection 70b in a lower area of the ring portion 70a. Each of the openings 84 is basically an elongated slot whose purpose is explained below.

The openings 86 are elongated slots that are formed in the projection 70b and are shown in FIGS. 11 and 12 as being angularly offset from a vertical position (e.g., by approximately 25 degrees) toward the apex of the projection 70b. The openings 88 are formed at opposing lateral sides of the ring portion 70a. The openings 88 are alignment holes. The purpose of the openings 86 and 88 is explained in greater detail below. The openings 90 are threaded holes, whose purpose is explained in greater detail below.

Figure 5:
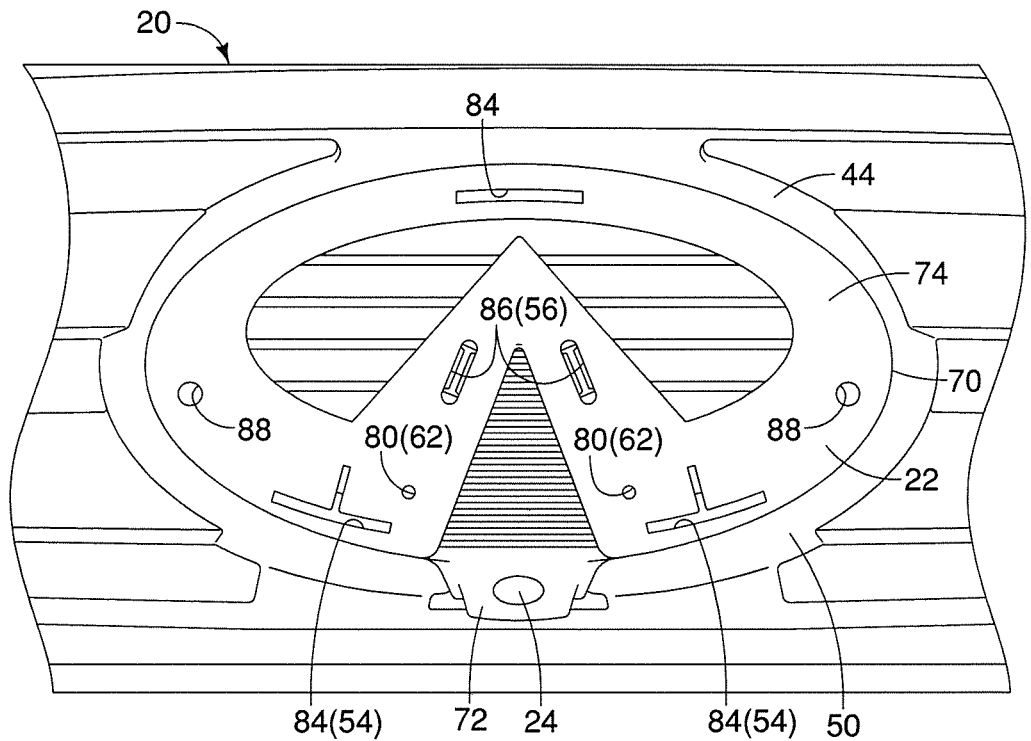
FIG. 5 is another front elevation of the grille, showing the camera support overlaying the emblem mounting portion in accordance with the one embodiment.

In FIG. 5, the attachment portion 70 of the camera support 22 is positioned against the emblem mounting portion 44, in an installed position. As can be seen by comparing the emblem mounting portion 44 of the grille 20 in FIG. 4 with the attachment portion 70 of the camera support 22 in FIG. 5: the openings 84 align with the apertures 54; the openings 86 align with the apertures 56; the openings 88 align with the apertures 58; and the openings 90 are open to the apertures 62. In other words, the openings 84, 86, 88 and 90 are arranged in a prescribed pattern that corresponds to the prescribed pattern defined by the apertures 54, 56, 58 and 62 in the emblem mounting portion 44 of the grille 20.

Figure 9:
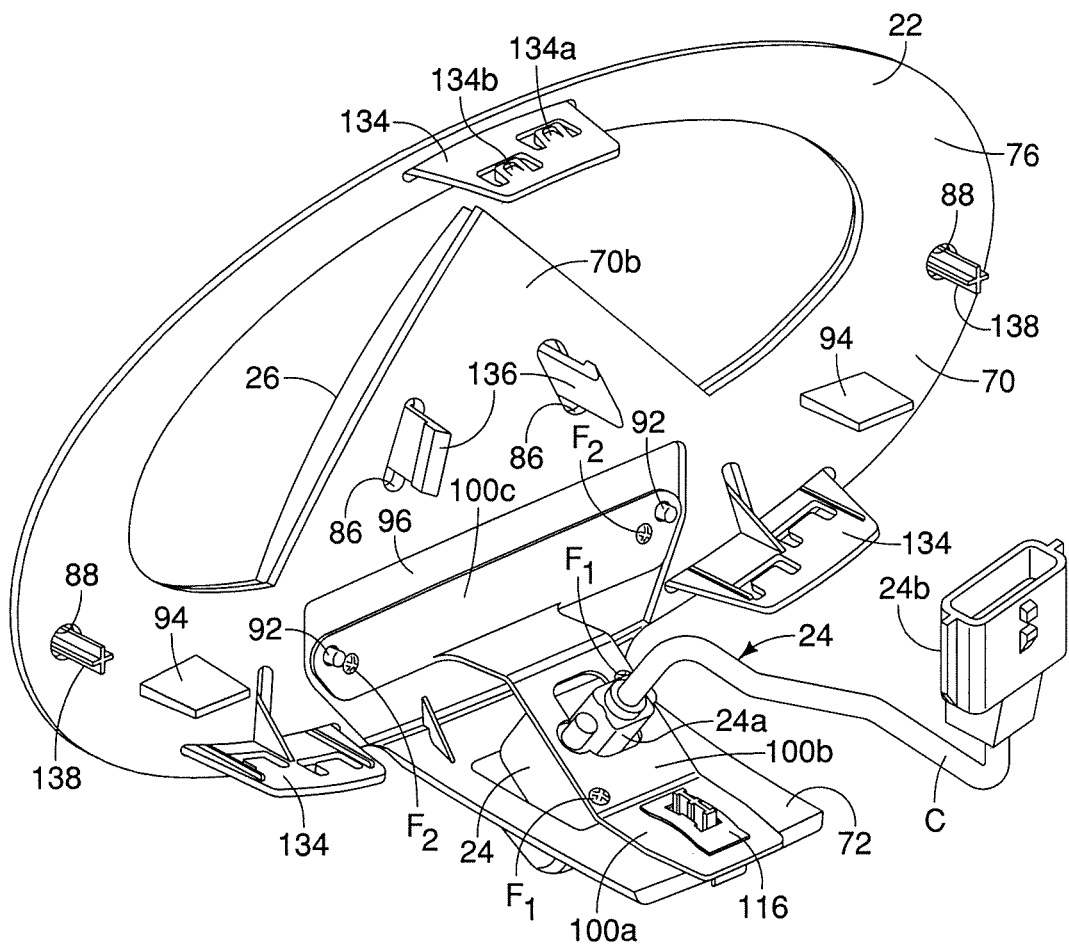
FIG. 9 is a perspective view of a partial assembly including the emblem and the camera installed to the camera support, the partial assembly shown removed from the vehicle in accordance with one embodiment.
Figure 10:
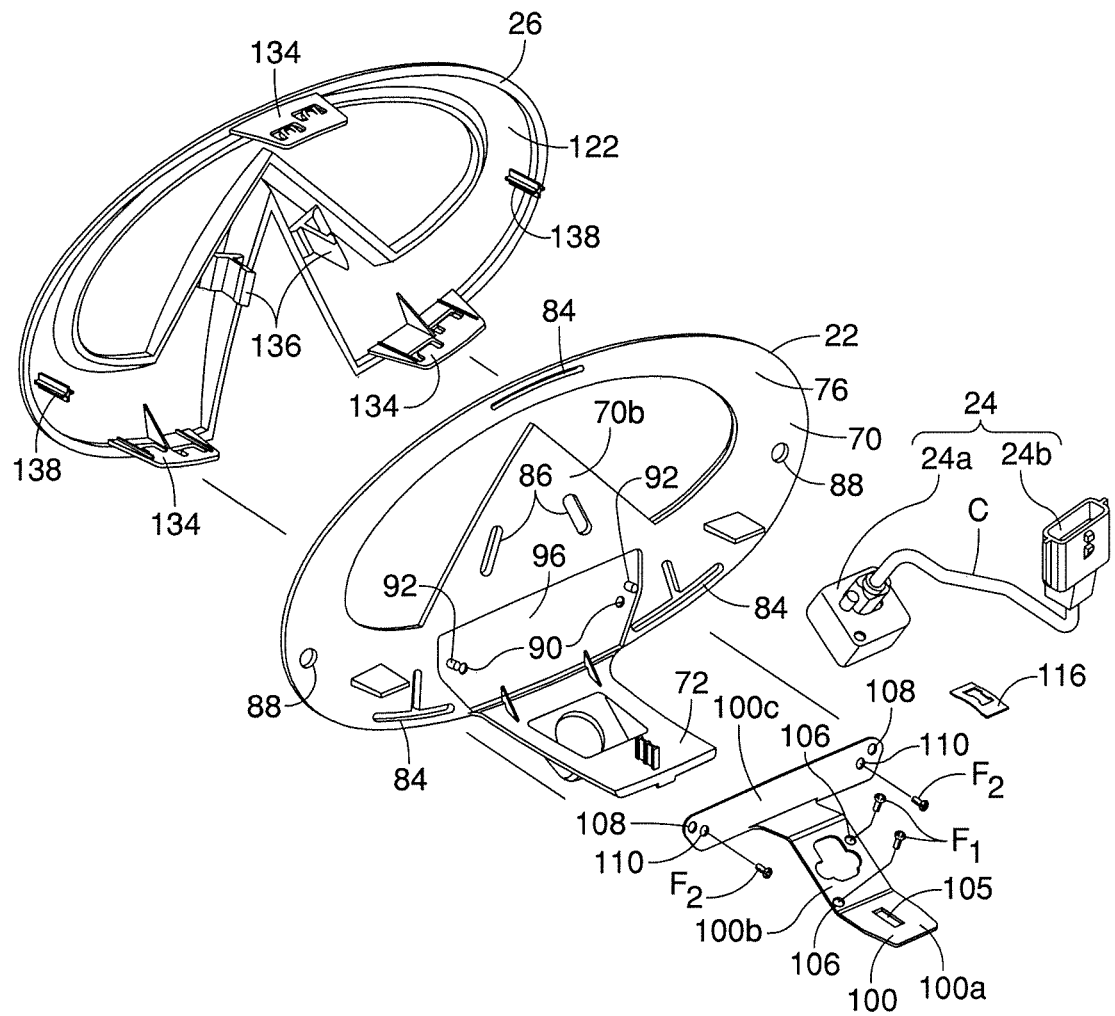
FIG. 10 is an exploded perspective view of the partial assembly depicted in FIG. 9 showing the camera support, the camera and the emblem separated from one another in accordance with one embodiment.

As shown in FIGS. 9, 10, 12 and 13, the rear surface 76 of the attachment portion 70 of the camera support 22 includes a pair of pins 92, a pair of projections 94 and a recessed area 96 (FIGS. 9, 10 and 12 only). The pins 92 are located within the recessed area 96 below the projection 70b of the attachment portion 70. The pins 92 are alignment pins that serve to locate the camera 24 relative to the extension portion 72 of the camera support 22, as further described below. The projections 94 extend from the attachment portion 70 in a direction that is approximately perpendicular to the rear surface 46 of the attachment portion 70. More specifically, the projections 94 extend approximately parallel to one another.

The projections 94 are arranged to align (within the prescribed pattern) with the apertures 60 of the emblem mounting portion 44. The projections 94 serve as alignment projections to properly locate or align the camera support 22 relative to the emblem mounting portion 44 of the grill 20.

The recessed area 96 is a portion of the camera support 22 with a reduced thickness and defines a concaved area of the rear surface 76 of the attachment portion 70. The recessed area 96 is dimensioned to receive a portion of a retaining bracket 100 that supports the camera 24 and is described in greater detail below along with a description of the camera 24.

A description of the extension portion 72 of the camera support 22 is now provided with specific reference to FIGS. 9-10 and 12-14. The extension portion 72 of the camera support 22 includes a camera retaining section 102 and a projection 104. The camera retaining section 102 is basically defined by a concave recess formed in the extension portion 72. The camera retaining section 102 has a bottom surface 102a with a lens receiving opening 102b.

Figure 13:
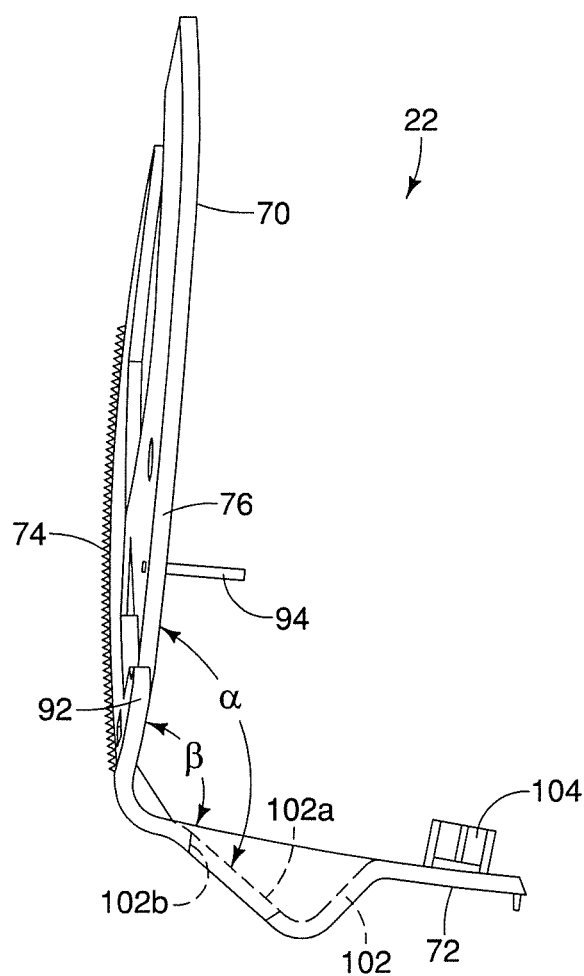
FIG. 13 is a side elevation of the camera support shown removed from all other elements of the partial assembly, in accordance with one embodiment.
Figure 14:
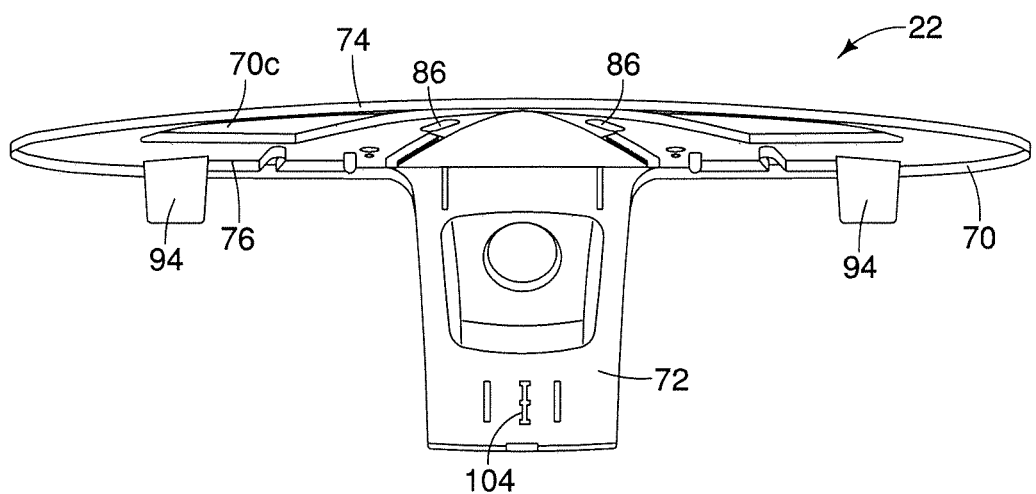
FIG. 14 is an upper plan view of the camera support with the camera support shown removed from all other elements of the partial assembly, in accordance with one embodiment.

As best shown in FIG. 13, the extension portion 72 is angularly offset from the attachment portion 70 by an angle β. The angle β is preferably between 90 and 100 degrees and shown as being approximately 95 degrees in FIG. 13 such that the extension portion meets the rear surface 76 of the attachment portion 70 to form an obtuse angle. Further, the bottom surface 102a of the extension portion 72 is angularly offset from the attachment portion 70 by an angle γ that is preferably between 120 and 145 degrees and shown as being approximately 130 degrees in FIG. 13.

The projection 104 extends upward proximate to a distal end of the extension portion 72 in a direction that is substantially perpendicular to a direction in which the extension portion 72 extends. The purpose of the projection 104 is described in greater detail below along with a description of the camera 24.

Figure 15:
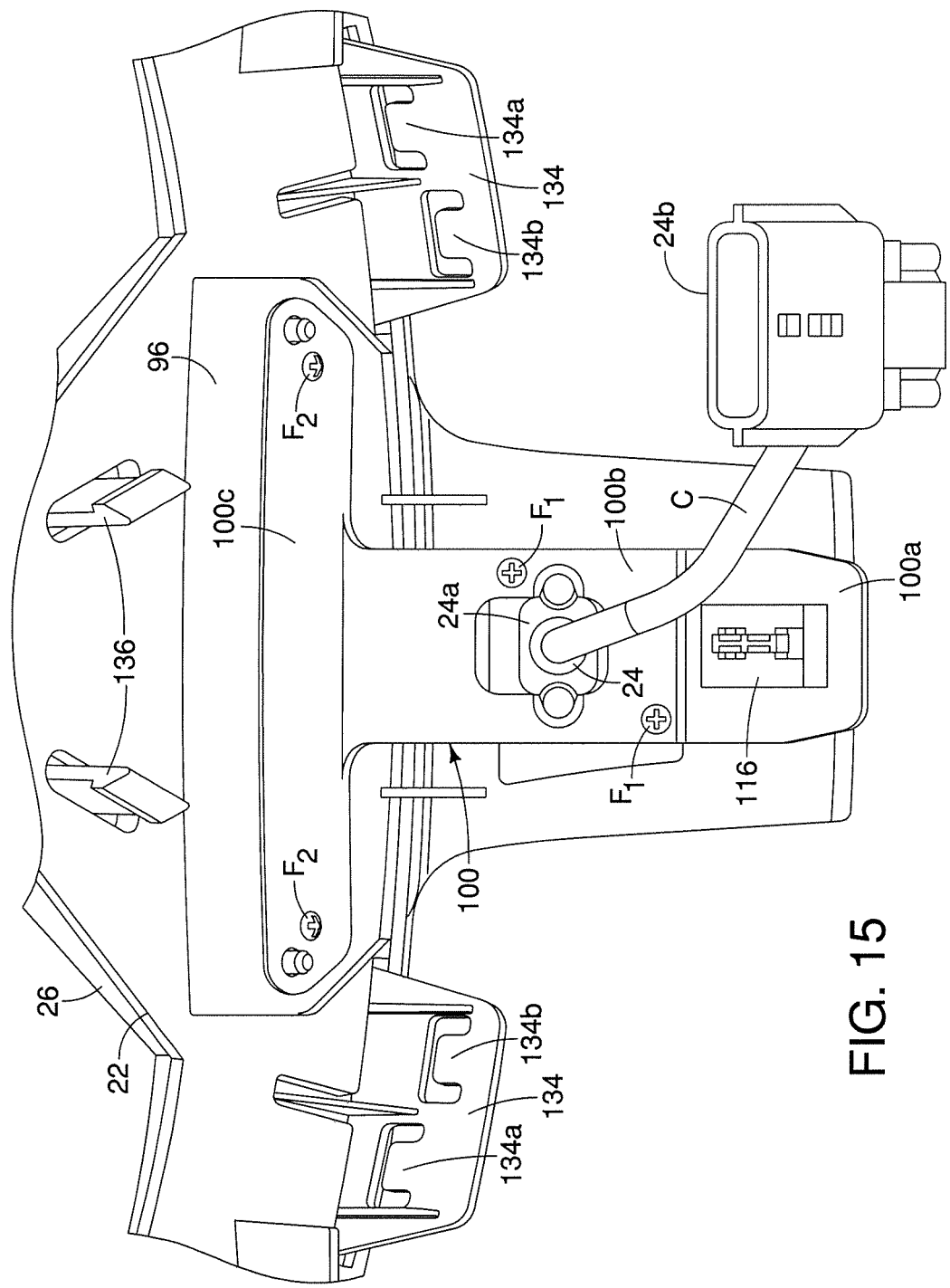
FIG. 15 is an upper perspective view showing the camera and the emblem installed to the camera support in accordance with one embodiment.

A description of the camera 24 is now provided with specific reference to FIGS. 9, 10 and 15. The camera 24 is a conventional electronic device for capturing images that includes a lens housing 24a, a connector 24b and a cable C connecting the lens housing 24a to the connector 24b. The lens housing 24a includes a lens L.

The connector 24b connects the camera 24 to a wiring harness (not shown) within the vehicle 10 and in turn connects to a video system that allows the driver of the vehicle 10 to monitor distances between objects and front surfaces of the vehicle 10. The vehicle 10 can include additional cameras, such as a rear camera (not shown) and side cameras (not shown) in order observe the distance between the vehicle 10 and objects near the vehicle 10 around a portion of or the entire perimeter of the vehicle 10. A video display (not shown) is typically provided in or on the instrument panel (not shown) of the vehicle 10, so that the driver can quickly look at the live video images (e.g., while operating the vehicle 10 in a reverse gear) provided by the cameras, including the camera 24. Such video systems are conventional and therefore further description is omitted for the sake of brevity.

The camera 24 includes the bracket 100, as best shown in FIG. 10. The bracket 100 has a rear section 100a, a mid-section 100b and a front section 100c. The rear section 100a, the mid-section 100b and the front section 100c are angularly offset from one another in order to conform to the shape of the extension portion 72, as shown in FIGS. 7, 9 and 10. The rear section 100a has a slot 105 dimensioned to receive the projection 104. The mid-section 100b has an opening with the cable C extending therethrough. The mid-section 100b also includes a pair of holes 106 that receive fasteners $F_1$, as explained below. The front section 100c also includes a first pair of holes 108 and a second pair of holes 110. The first pair of holes 108 is positioned to receive the pins 92 of the attachment portion 70 of the camera support 22, as explained below. The second pair of holes 110 is positioned to receive fasteners $F_2$, as explained below.

The camera 24 is fixedly secured to the extension portion 72 of the camera support 22, as indicated in FIG. 10 and shown in FIGS. 9 and 15. Specifically, the camera 24 fits within the camera retaining section 102 of the extension portion 72, with the lens L extending partially through the lens receiving opening 102b, as shown in FIGS. 7 and 23. The bracket 100 is installed to the camera support 22, securing the camera lens housing 24a within the camera retaining section 102, between the mid-section 100b of the bracket 100 and the extension portion 72, as best shown in FIGS. 9 and 15.

In the installed position, the mid-section 100b of the bracket 100 fits over the lens housing 24a and is fastened to the lens housing 24a by the fasteners $F_1$. The fasteners $F_1$ thread into holes formed in the lens housing 24a. As the bracket 100 is installed to the camera support 22, the projection 104 of the extension portion 72 extends through the slot 105 in the rear section 100a of the bracket 100. A fastening clip 116 is then force fitted over the projection 104, creating an interference fit and fixing the rear section 100a of the bracket 100 to the extension portion 72 of the camera support 22. Further, as the bracket 100 is installed to the camera support 22, the pins 92 of the attachment portion 70 of the camera support 22 are passed through the holes 108 of the front section 100c of the retaining bracket 100. Further, the front section 100c fits within the recessed area 96. Preferably the thickness of the front section 100c of the retaining bracket 100 is approximately equal to the depth of the recessed area 96 of the attachment portion 70 of the camera support 22. Thus, the front section 100c is situated flush with the rear surface 76 of the camera support 22. Finally, the fasteners $F_2$ are inserted through the holes 110 and threadedly fitted to the threaded holes 90 of the attachment portion 70 of the camera support 22, as shown in FIGS. 9 and 15 and indicated in FIG. 10. Thus, the camera 24 is fixed to the camera support 22.

In the depicted embodiment, the camera 24 is attached to the camera support 22 prior to installation to the grille 20. Specifically, the camera 24 is fitted to the camera support 22 and then the retaining bracket 100 is fitted to the camera 24 and the camera support 22. However, it should be understood from the drawings and the description herein that the order of assembly of the camera to the vehicle 10 can be modified while remaining within the scope of the invention.

A description of the emblem 26 is now provided with reference to FIGS. 6, 7, 10 and 16-22. The emblem 26 includes an outer surface 120 and an inner surface 122 that is opposite the outer surface 120. The outer surface 120 is visible in FIGS. 6 and 7. As best shown in FIG. 6, the outer surface 120 (or front surface) has a generally oval shape with an inverted V-shaped section 124 that extends upward, defining an inverted V-shaped gap 126 at a bottom central area of the oval.

Figure 16:
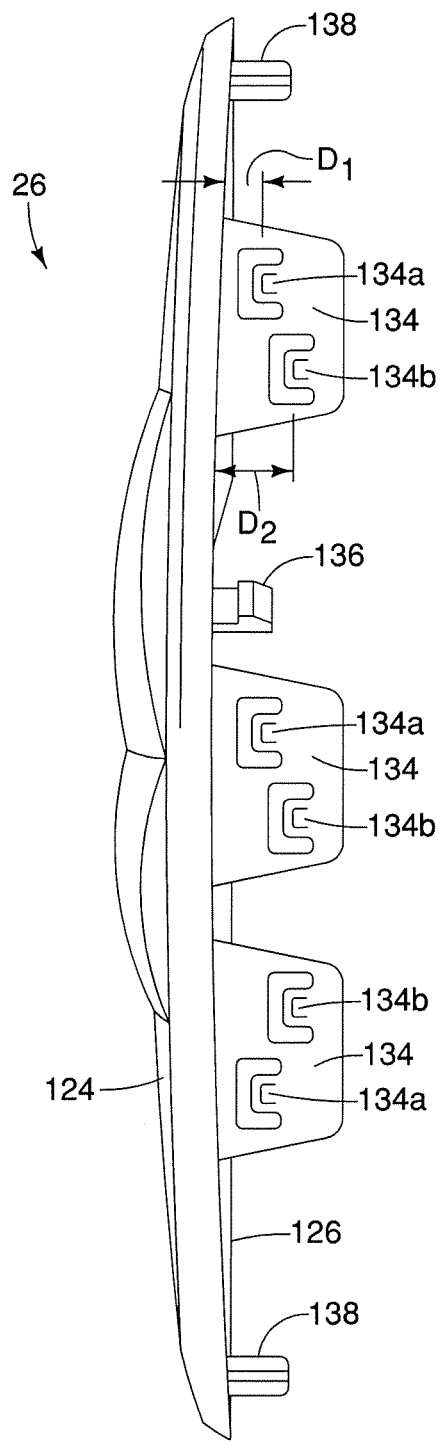
FIG. 16 is an upper plan view of the emblem showing snap-fitting projections in accordance with one embodiment.

As shown in FIGS. 9, 10 and 16, the inner surface 122 is a rearward surface of the emblem 26 and includes three different sets of projections, namely projections 134, projections 136 and projections 138. The emblem 26, the projections 134, the projections 136 and the projections 138 are preferably molded as a single, unitary, monolithic element, with no seams. The emblem and projections 134, 136 and 138 are made from any of a variety of materials, such as plastics, polymers, composite materials, metal and/or metal alloys. The outer surface 120 of the emblem 26 can be painted, plated and/or adorned with chrome, gold or other colored finishes adhered thereto for aesthetic purposes.

Figure 20:
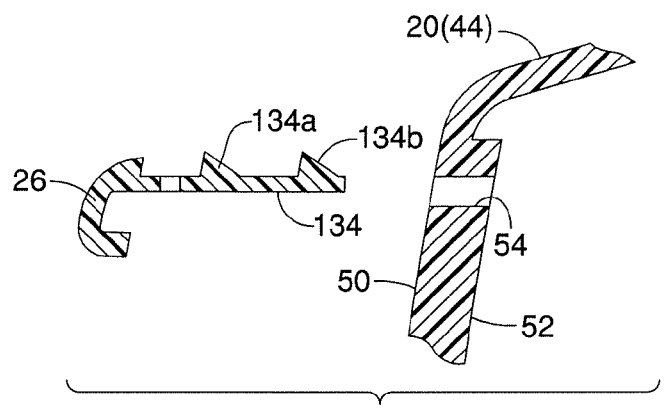
FIG. 20 is a partial cross-sectional view of the emblem and the emblem mounting portion of the grille, showing the snap-fitting projections of the emblem and an aperture of the emblem mounting portion separated from one another in accordance with one embodiment.
Figure 21:
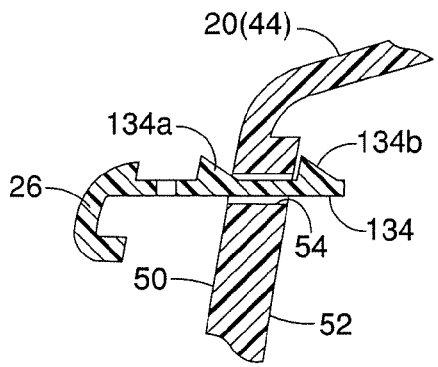
FIG. 21 is another partial cross-sectional view of the emblem and the emblem mounting portion of the grille, showing a first one of the snap-fitting projections installed to the emblem mounting portion in the first mounting position (corresponding to FIG. 17), in accordance with one embodiment.
Figure 22:
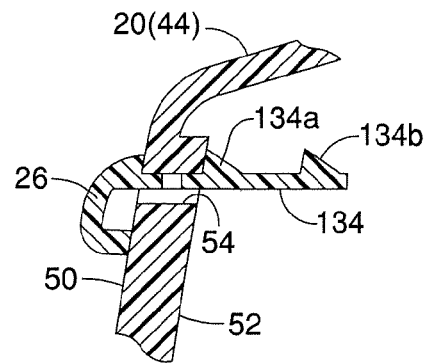
FIG. 22 is another partial cross-sectional view of the emblem and the emblem mounting portion of the grille, showing a second one of the snap-fitting projections installed to the emblem mounting portion in the second mounting position (corresponding to FIG. 18), in accordance with one embodiment.

The projections 134 are elongated thin projections that extend from areas of the inner surface 122 adjacent to an outer periphery of the emblem 26. One of the projections 134 is located at an upper central area of the emblem 26 and the other two of the projections 134 are located on opposite sides of the V-shaped gap 126. Each of the projections 134 includes two separate snap-fitting elements 134a and 134b, as best shown in FIGS. 16 and 20. As best shown in FIG. 16, the snap-fitting elements 134a are positioned a first distance $D_1$ away from the inner surface 122 and the snap-fitting elements 134b are positioned a second distance $D_2$ away from the inner surface 122. As indicated in FIG. 16, the second distance $D_2$ is greater than the first distance $D_1$. The purpose of the snap-fitting elements 134a and the snap-fitting elements 134b is explained below.

The projections 136 also extend away from the inner surface 122 in the area of the emblem 26 that defines the inverted V-shaped section 124 on opposite sides of the apex of the inverted V-shaped section 124. The projections 136 are basically snap-fit tabs whose purpose is explained below.

The projections 138 are rounded, cylindrical or cross-shaped projections that extend away from the inner surface 122 of the emblem 26 at lateral side areas of the emblem 26. The projections 138 are used for aligning the emblem 26, the camera support 22 and the emblem mounting portion 44, during assembly, as explained further below.

The projections 134, 136 and 138 basically define a second mounting structure that mates with the first mounting structure of the emblem mounting portion 44 of the grille 20. More specifically, the projections 134, 136 and 138 are positioned to extend through the openings 84, 86 and 88, respectively, of the attachment portion 70 of the camera support 22, and then further extend into the apertures 54, 56 and 58, respectively, of the emblem mounting portion 44 of the grille 20. In other words, the projections 134 are aligned with the openings 84 and the apertures 54, the projections 136 are aligned with the openings 86 and the apertures 56, and the projections 138 are aligned with the openings 88 and the apertures 58.

The front grill assembly 12 is assembled in a manner now described initially with reference to FIG. 10. First, as described above, the camera 24 is installed to the camera support 22 with the retaining bracket 100. Next, the emblem 26 is loosely installed to the camera support 22. Specifically, the projections 138 (alignment projections) are arranged to extend through the openings 88 (alignment holes) of the camera support 22. At the same time, the projections 134 align with and are inserted into the openings 84, and the projections 136 align with and are inserted into the openings 86.

Finally, the emblem 26, the camera support 22 and the camera 24 are installed to the emblem mounting portion 44. Specifically, the projections 134 (which protrude through the openings 84) are inserted into the apertures 54. Simultaneously, the projections 136 (which protrude through the openings 86) are inserted into the apertures 56, and the projections 138 (which protrude through the openings 88) are inserted into the apertures 58. By pushing on the emblem 26, the projections 134 move through the apertures 134 until the snap-fitting elements 134b engage the rearwardly facing surface 52 of the emblem mounting portion 44, thus securing the emblem 26 and the camera support 22 in position against the forwardly facing surface 50 of the emblem mounting portion 44.

Further, as mentioned above, the pins 92 align the retaining bracket 100 to the camera support 22 and the fasteners F2 fix the retaining bracket 100 to the camera support 22. Once the emblem 26, the camera support 22 and the camera 24 are installed to the emblem mounting portion 44, the pins 92 and the fasteners F$_2$ align with the apertures 62 in the emblem mounting portion 44 of the grille 20. Hence, as shown in FIG. 8, the pins 92 and the fasteners F$_2$ are visible through the apertures 62.

Once fully installed, the inner surface 122 of the emblem 26 which includes the second mounting structure (the projections 134, 136 and 138) secures both the emblem 26 and the camera support 22 to the grille 20, with the camera support 22 being held between the inner surface 122 and the emblem mounting portion 44 such that the inner surface 122 overlays the front surface 74 of the attachment portion 70 of the camera support 22.

Consequently, it is optional but not necessary for the camera support 22 to include independent fastening parts. Rather, the emblem mounting portion 44 and the emblem 26 are provided with the first and second mounting structures (respectively), with the camera support 22 being sandwiched between the emblem 26 and the emblem mounting portion 44. Further, the projections 138 (first alignment projections) extend through the openings 88 (second alignment holes) in the camera support 22 and through the apertures 58 (first alignment holes) in the emblem mounting portion 44, thus preventing movement of the camera support 22 relative to the emblem 26 and the emblem mounting portion 44.

Figure 18:
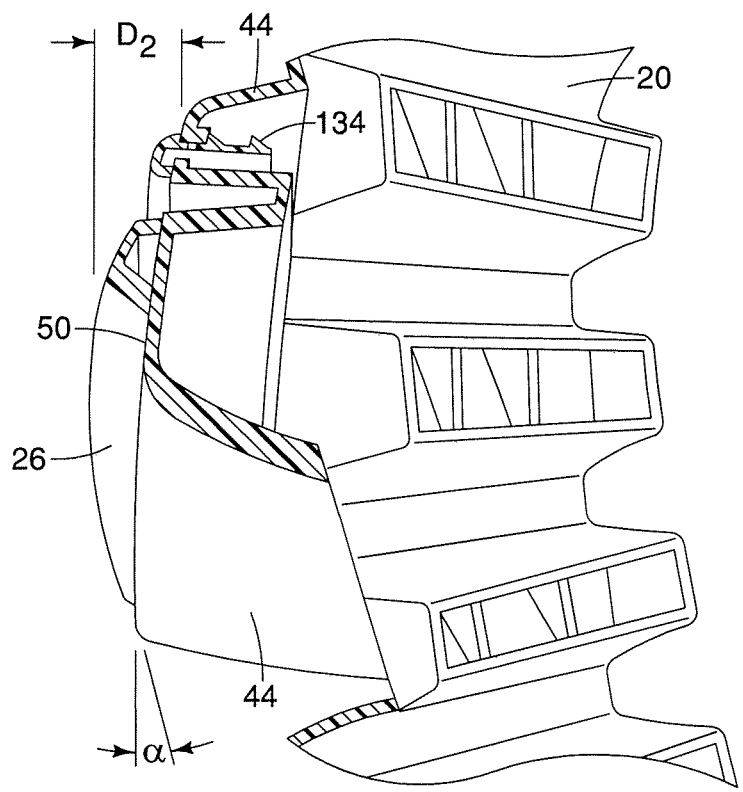
FIG. 18 is another side cross-sectional view of the grille and the emblem with the camera and camera support absent showing the emblem installed in a second mounting position of the two stage snap-fit configuration in accordance with one embodiment.
Figure 19:
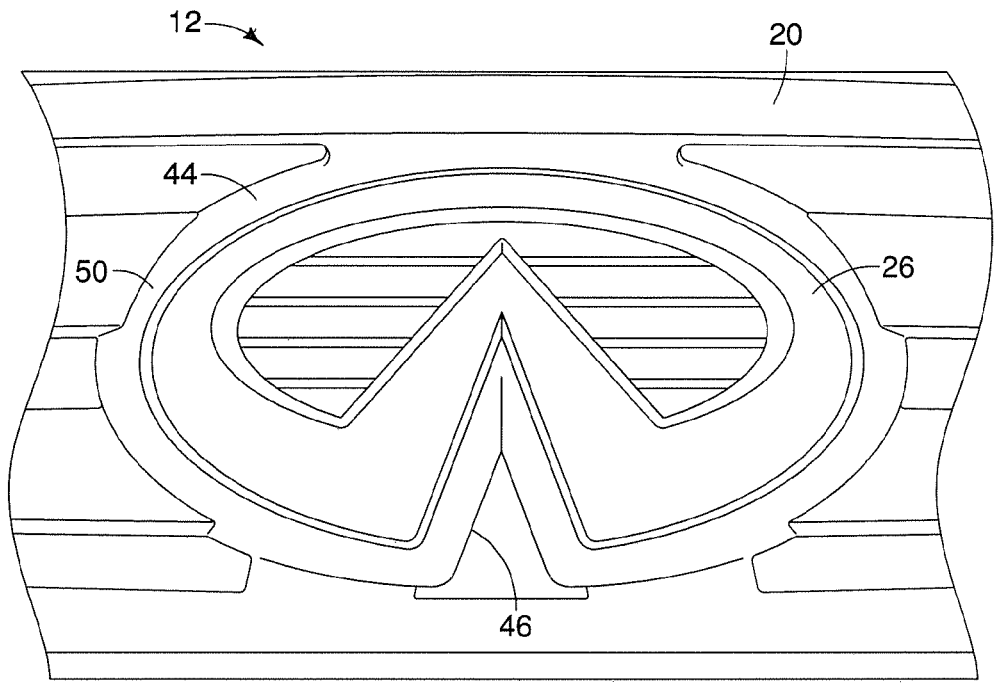
FIG. 19 is a front elevation of the grille similar to FIG. 6, showing the emblem installed to the emblem mounting portion with the camera support absent in accordance with one embodiment.

As shown in FIGS. 2 and 18, the camera 24 is positioned relative to the grille 20, the plurality of laterally extending slats 40 and the emblem 26 such that the camera has an unobstructed 180 degree field of vision F (shown as being slightly less that 180 degrees in FIG. 2 for ease of illustration) in a forward direction of the vehicle 10. The camera 24, and in particular the camera lens L, is further positioned to capture images directly below the emblem 26 and directly in front of the vehicle 10.

As is indicated in FIGS. 7 and 23, the camera 24 is disposed rearward of the outer surface 120 of the emblem 26. Further, the camera 24 is positioned rearward of the rear surface 76 of the camera support 22 (the support bracket) such that it is spaced apart from the emblem 26. Consequently, the camera 26 is located above the lowest one of the plurality of laterally extending slats 50, as shown in FIG. 23.

Another feature of the invention is described now with specific reference to FIGS. 17-22. As described above, the projections 134 extend from the inner surface 122. The projections 134 include the snap-fitting elements 134a and 134b that are spaced apart from the inner surface 122 by the first distance D$_1$ and the second distance D$_2$. The configuration and arrangement of the snap-fitting elements 134a and 134b provides a two-stage snap-fit configuration.

More specifically, the snap-fitting elements 134a and 134b (first and second snap-fit projections) permit selective attachment of the emblem 26 to the emblem mounting portion 44 of the grille 20 in two different mounting positions. In a first mounting position shown in FIG. 17, the forwardly facing surface 50 of the grille 20 is located a first distance D$_1$ from the outer surface 120 of the emblem 26. Additionally, while in the first mounting position (also represented in FIG. 21), the snap-fitting element 134b is engaged with the rearwardly facing surface 52 of the emblem mounting portion 44, and the snap-fitting element 134a is free from engagement with the rearwardly facing surface 52.

Further, in a second mounting position shown in FIG. 18, the forwardly facing surface 50 of the grille 20 is located a second distance D$_2$ from the outer surface 120 of the emblem 26, the second distance D$_2$ being smaller than the first distance D$_1$. Additionally, while in the second mounting position (also represented in FIG. 22), the snap-fitting element 134a is engaged with the rearwardly facing surface 52 of the emblem mounting portion 44, and the snap-fitting element 134b is free from engagement with the rearwardly facing surface 52.

Figure 17:
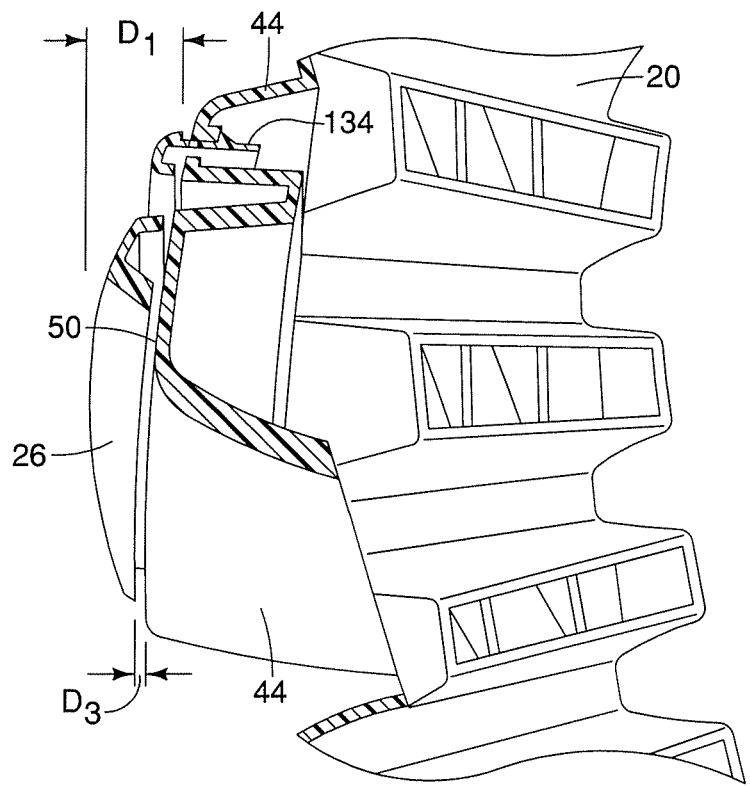
FIG. 17 is a side cross-sectional view of the grille and the emblem with the camera and camera support absent showing the emblem installed in a first mounting position of a two stage snap-fit configuration in accordance with one embodiment.

In the first mounting position shown in FIG. 17, the inner surface 122 of the emblem 26 is spaced apart from the forwardly facing surface 50 of the grille 20 by a distance D$_3$. The distance D$_3$ corresponds to the thickness of the attachment portion 70 of the camera support 22. In other words, the first mounting position of the emblem 26 corresponds to the installed position shown in FIG. 7, with the emblem 26 securing the camera support 22 to the emblem mounting portion 44 of the grille 20.

In the second mounting position shown in FIG. 18, the inner surface 122 of the emblem 26 directly abuts the forwardly facing surface 50 of the grille 20. In other words, in the second mounting position, the inner surface 122 of the emblem 26 contacts and lies against the forwardly facing surface 50 of the grille 20.

With the above described two-stage snap-fit configuration, the snap-fitting elements 134a and 134b make it possible to install the emblem 26 with or without the camera support 22 and the camera 24. Thus, it is possible to utilize the emblem 26 regardless of whether the vehicle 10 includes the camera support 22 and the camera 24.

The vehicle 10 includes many conventional components that are well known in the art. Since these conventional vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the teens, "including", "having" and their derivatives. Also, the terms "part," "section," "portion," "member" or "element" when used in the singular can have the dual meaning of a single part or a plurality of parts, except where such elements or members are specifically described as being unitary and/or monolithic. The term "monolithic element" means a single element that is a single piece, formed or manufactured as a single element or piece and does not include assembled pieces. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle grille assembly. Accordingly, these terms, as utilized to describe the present invention should be interpreted relative to a vehicle equipped with the vehicle grille assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle grille assembly comprising:
  a vehicle grille including an emblem mounting portion having a first mounting structure;
  an emblem including an outer surface and an inner surface that is opposite the outer surface, the inner surface having a second mounting structure that directly attaches to the first mounting structure of the emblem mounting portion;
  a camera support having an attachment portion and an extension portion, the attachment portion being sandwiched between the emblem mounting portion of the vehicle grille and the inner surface of the emblem, the attachment portion defining at least one opening with one of the first and second mounting structures extending through the at least one opening of the attachment portion to directly attach the one of the first and second mounting structures to the other of the first and second mounting structures; and
  a camera fixedly mounted to the extension portion of the camera support.

2. The vehicle grille assembly according to claim 1, wherein
  the camera is positioned relative to the vehicle grille and the emblem such that the camera has an unobstructed 180 degree field of vision in a direction toward the emblem relative to the vehicle grille.

3. The vehicle grille assembly according to claim 1, wherein
  the emblem mounting portion includes a forwardly facing surface that contacts the camera support and a rearwardly facing surface, the extension portion of the camera support extending beyond the forwardly facing surface in a direction away from the emblem.

4. The vehicle grille assembly according to claim 1, wherein
  the emblem has a first overall thickness and the attachment portion of the camera support has a second overall thickness that is less than the first overall thickness.

5. A vehicle grille assembly comprising:
  a vehicle grille including an emblem mounting portion having a first mounting structure, the first mounting structure including a plurality of first openings arranged in a prescribed pattern relative to one another;
  an emblem including an outer surface and an inner surface that is opposite the outer surface, the inner surface having a second mounting structure that directly attaches to the first mounting structure of the emblem mounting portion, the second mounting structure including a plurality of projections, with each of the plurality of projections being arranged to align with a respective one of the plurality of first openings;
  a camera support having an attachment portion and an extension portion, the attachment portion being sandwiched between the emblem mounting portion of the vehicle grille and the inner surface of the emblem, the attachment portion of the camera support including a plurality of second openings, with each of the plurality of second openings being arranged to align with a respective one of the plurality of first openings such that each of the plurality of projections extends through a corresponding one of the plurality of second openings to engage corresponding peripheries of the plurality of first openings; and
  a camera fixedly mounted to the extension portion of the camera support.

6. The vehicle grille assembly according to claim 1, wherein
  one of the first and second mounting structures includes snap-fitting projections.

7. A vehicle grille assembly comprising:
  a vehicle front grille including an emblem mounting portion having a forwardly facing surface and a rearwardly facing surface;
  a camera support including an attachment portion and an extension portion, the attachment portion having a front surface and a rear surface, the rear surface overlaying the emblem mounting portion, the extension portion extending beyond the forwardly facing surface of the emblem mounting portion in a direction toward the vehicle front grille relative to the camera support;
  an emblem including an outer surface and an inner surface that is opposite the outer surface, the inner surface having a mounting structure that secures the emblem directly to the emblem mounting portion of the vehicle front grille with the camera support held between the inner surface of the emblem and the forwardly facing surface of the emblem mounting portion such that the inner surface overlays the front surface of the attachment portion of the camera support; and
  a camera mounted to the extension portion such that the camera extends beyond the forwardly facing surface of the emblem mounting portion in a direction away from the emblem.

8. The vehicle grille assembly according to claim 7, wherein
  the extension portion of the camera support is angularly offset from the attachment portion such that the extension portion meets the rear surface of the attachment portion to form an obtuse angle.

9. The vehicle grille assembly according to claim 7, wherein
  the mounting structure of the emblem includes a snap-fit projection arranged and configured to secure the emblem and the camera support to the emblem mounting portion.

10. The vehicle grille assembly according to claim 7, wherein
  the vehicle front grille includes a plurality of laterally extending and spaced apart slats, the camera being situated between two of the plurality of slats, and the camera is positioned relative to the emblem mounting portion, the plurality of slats and the emblem such that the camera has an unobstructed 180 degree field of vision in a direction toward the emblem relative to the vehicle front grille.

11. The vehicle grille assembly according to claim 7, wherein the emblem mounting portion includes a plurality of first openings arranged in a prescribed pattern relative to one another that extend from the forwardly facing surface to the rearwardly facing surface, the mounting structure of the emblem includes a plurality of projections, with each of the plurality of projections being arranged to align with a respective one of the plurality of first openings, and the attachment portion of the camera support includes a plurality of second openings, with each of the plurality of second openings being arranged to align with a respective one of the plurality of first openings such that each of the plurality of projections extends through a corresponding one of the plurality of second openings to engage corresponding peripheries of the plurality of first openings.

12. The vehicle grille assembly according to claim 7, wherein at least one projection extends away from the inner surface of the emblem, with the at least one projection extending through a corresponding first alignment hole defined through the attachment portion and a corresponding second alignment hole defined through the emblem mounting portion.

* * * * *